(12) United States Patent
Sambongi

(10) Patent No.: US 8,482,459 B2
(45) Date of Patent: Jul. 9, 2013

(54) POSITIONING DEVICE, POSITIONING METHOD AND STORAGE MEDIUM STORING PROGRAM

(75) Inventor: Masao Sambongi, Hachioji (JP)

(73) Assignee: Casio Computer Co., Ltd, Tokyo (JP)

( * ) Notice: Subject to any disclaimer, the term of this patent is extended or adjusted under 35 U.S.C. 154(b) by 245 days.

(21) Appl. No.: 13/020,862

(22) Filed: Feb. 4, 2011

(65) Prior Publication Data

US 2011/0205107 A1 Aug. 25, 2011

(30) Foreign Application Priority Data

Feb. 22, 2010 (JP) .................................. 2010-035540

(51) Int. Cl.
*G01S 19/42* (2010.01)
(52) U.S. Cl.
USPC .................................................... 342/357.25
(58) Field of Classification Search
USPC .................................................... 342/357.25
See application file for complete search history.

(56) References Cited

U.S. PATENT DOCUMENTS

| | | | |
|---|---|---|---|
| 5,854,605 A | 12/1998 | Gildea | |
| 5,864,315 A | 1/1999 | Welles, II et al. | |
| 7,375,681 B1 | 5/2008 | Woo | |
| 2005/0162306 A1* | 7/2005 | Babitch et al. | 342/357.05 |
| 2008/0008278 A1* | 1/2008 | Kontola et al. | 375/354 |
| 2009/0278738 A1 | 11/2009 | Gopinath | |

FOREIGN PATENT DOCUMENTS

| | | |
|---|---|---|
| CN | 101410765 | 4/2009 |
| EP | 2 120 061 A1 | 11/2009 |
| EP | 2 154 545 A1 | 2/2010 |
| JP | 05-249221 | 9/1993 |
| JP | 08-015463 | 1/1996 |
| JP | 10-031061 | 2/1998 |
| JP | 10-082875 | 3/1998 |
| JP | 2001-242233 | 9/2001 |
| JP | 2007-248345 | 9/2007 |
| WO | 03/038464 A2 | 5/2003 |

OTHER PUBLICATIONS

Japanese Office Action for Japanese Application No. 2010-035540 mailed on Nov. 1, 2011.
Extended European Search Report for European Application No. 11153059.8 mailed on May 26, 2011.
Japanese Office Action for Japanese Application No. 2010-035540 mailed on Mar. 6, 2012.
Chinese Office Action for Chinese Patent Application No. 2011100437804 mailed on Aug. 16, 2012.
Office Action for Korean Patent Application No. 10-2011-0014177 dated May 30, 2012, 5 pages.

* cited by examiner

*Primary Examiner* — Harry Liu
(74) *Attorney, Agent, or Firm* — Turocy & Watson, LLP

(57) ABSTRACT

A positioning device including: a time counter for counting time; a first reception controller (S1) for intermittently receiving time information from the positioning satellite through a reception unit; a time revising unit (S14) for revising the time counted by the time counter based on the received time information; an error calculator (S12, S13) for calculating an error per unit time ("α/β") in the time counted by the time counter based on the received time information and the time counted by the time counter; a time correcting unit (S4) for calculating corrected time by removing an error from the time counted by the time counter based on the calculated error per unit time ("α/β"); and a positioning unit (S5 to S8) for acquiring a signal of the positioning satellite by using the corrected time and measuring a position of the positioning device based on the acquired signal.

7 Claims, 4 Drawing Sheets

POSITIONING DEVICE, POSITIONING METHOD AND STORAGE MEDIUM STORING PROGRAM

CROSS-REFERENCE TO RELATED APPLICATIONS

This application is based upon and claims the benefit of priority from the prior Japanese Patent Application No. 2010-35540, filed on Feb. 22, 2010 and the entire contents of which are incorporated herein by reference.

BACKGROUND OF THE INVENTION

1. Field of the Invention

The present invention relates to a positioning device for receiving a signal of a positioning satellite to perform position measurement, a positioning method and a storage medium in which a program is stored.

2. Description of the Related Art

Some techniques for completing position measurement at short times by a GPS (Global Positioning System) positioning device have been hitherto proposed as disclosed in JP-A-2007-248345 and JP-A-H10-031061. Furthermore, a device for automatically correcting the time of a clock by using time information contained in a signal of a GPS satellite has been also proposed as disclosed in JP-A-H08-015463 and JP-A-H05-249221.

In general, the position measurement based on GPS is performed as follows. First, the positioning device acquires transmission electric waves of a plurality of GPS satellites, and calculates pseudo-distances to the plurality of GPS satellites on the basis of respective positioning codes contained in the transmission electric waves. Furthermore, the positioning device receives ephemeris information contained in the transmission electric waves, and calculates the positions of the plurality of GPS satellites from the ephemeris information. Then, the position of the positioning device itself is determined on the basis of these results.

The electric waves transmitted from the GPS satellite are faint, and they are subjected to spectrum spreading. Therefore, in order to acquire and demodulate these electric waves, it is necessary to perform reception processing while establishing synchronization between the transmission side and the reception side.

The GPS satellite has accurate time information because of an atomic clock; however, a time counting circuit mounted in equipment of the reception side is not so accurate. Therefore, when a large error occurs in the counted time of the time counting circuit, it takes a long time to acquire electric waves due to unconformity in timing between the transmission side and the reception side.

Therefore, the inventor has considered a construction of intermittently receiving a signal from a GPS satellite during even a period for which position measurement is not executed and correcting the time of the time counting circuit to the time of GPS, thereby suppressing the error of the counted time to a small level. By this construction, the error of the counted time is not increased, and the electric wave transmitted from the GPS satellite can be quickly acquired.

Furthermore, it is also required to avoid needless signal reception because the reception of a signal from a GPS satellite requires relatively large power.

An object of this invention is to provide a positioning device, a positioning method and a program-stored storage medium that can quickly acquire a transmission electric wave of a GPS satellite on the basis of accurately corrected counted time, and also reduce signal reception frequency for time revision, thereby reducing power consumption.

SUMMARY OF THE INVENTION

In order to attain the above object, a positioning device according to the present invention comprises a reception unit for receiving a signal transmitted from a positioning satellite; a time counter for counting time; a first reception controller for intermittently receiving time information from the positioning satellite through the reception unit; a time revising unit for revising the time counted by the time counter based on the received time information; an error calculator for calculating an error per unit time in the time counted by the time counter based on the received time information and the time counted by the time counter; a time correcting unit for calculating corrected time by removing an error from the time counted by the time counter based on the calculated error per unit time; and a positioning unit for acquiring a signal of the positioning satellite by using the corrected time and measuring a position of the positioning device based on the acquired signal.

A positioning method according to the present invention is for performing positioning of a positioning device by using a reception unit which receives a signal transmitted from a positioning satellite and a time counter which counts time, the positioning method comprises first controlling intermittent reception of time information from the positioning satellite through the reception unit; revising the time counted by the time counter based on the received time information; calculating an error per unit time in the time counted by the time counter based on the received time information and the time counted by the time counter; correcting the time to obtain corrected time by removing an error from the time counted by the time counter based on the calculated error per unit time; and positioning the position of the positioning device by acquiring a signal of the positioning satellite by using the corrected time and by measuring the position of the positioning device based on the acquired signal.

A storage medium according to the present invention is readable by a computer that controls a reception unit for receiving a signal transmitted from a positioning satellite and a time counter for counting time, and stores a program making the computer realize functions of: a first reception control function of intermittently receiving time information from the positioning satellite through the reception unit; a time revising function of revising the time counted by the time counter based on the received time information; an error calculating function of calculating an error per unit time in the time counted by the time counter based on the received time information and the time counted by of the time counter; a time correcting function of calculating a corrected time by removing an error from the time counted by the time counter based on the calculated error per unit time; and a positioning function of acquiring a signal of the positioning satellite by using the corrected time to measure a position of a positioning device based on the acquired signal.

DETAILED DESCRIPTION OF THE PREFERRED EMBODIMENTS

An embodiment according to the present invention will be described with reference to the drawings.

Figure 1:
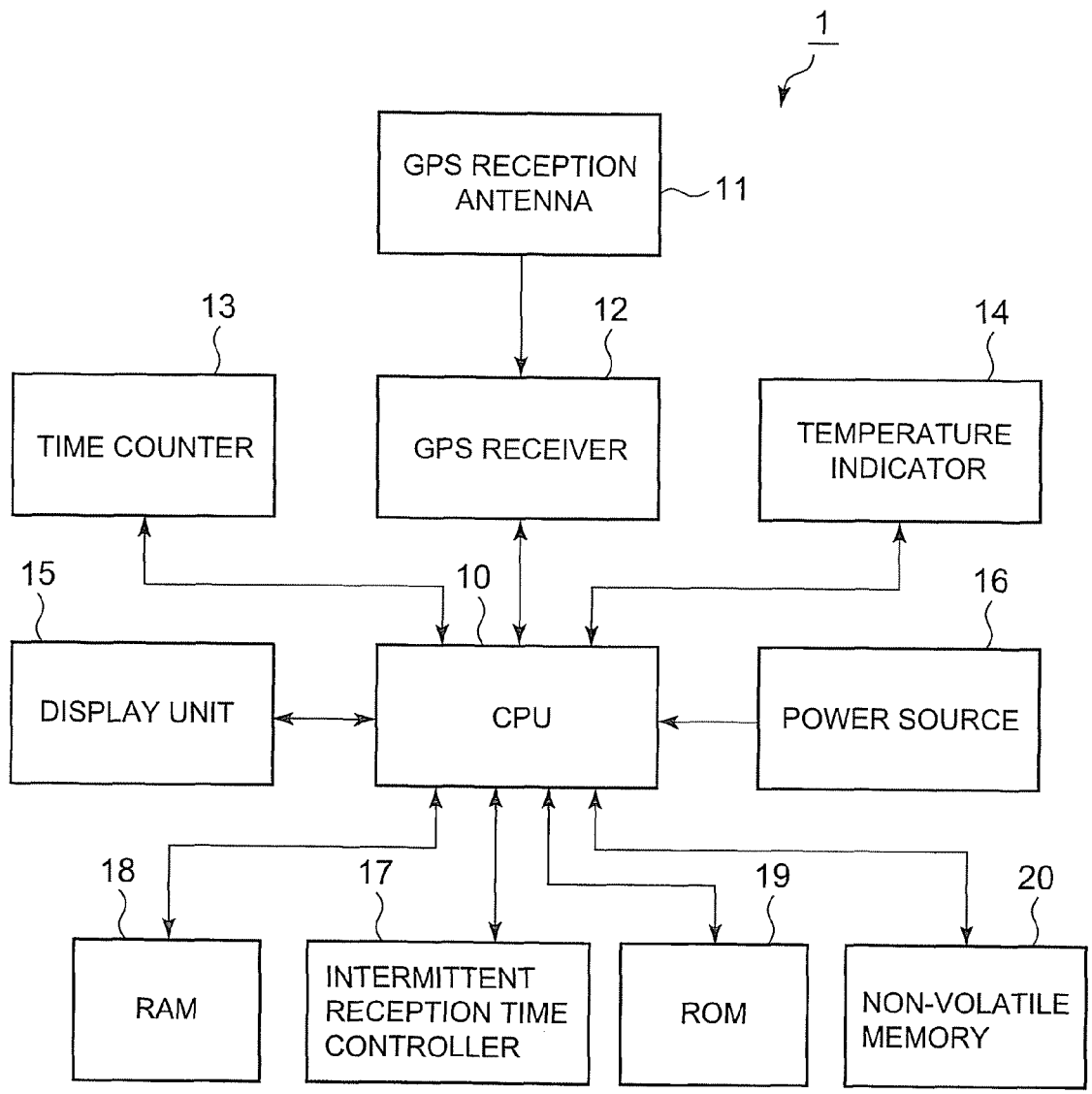
FIG. 1 is a block diagram showing the whole of a positioning device according to an embodiment of the present invention.

FIG. 1 is a block diagram showing the whole of a positioning device 1 according to an embodiment of the present invention.

The positioning device 1 of this embodiment is a device for recording position data by intermittently measuring the position through GPS (Global Positioning System). As shown in FIG. 1, the positioning device 1 has a GPS reception antenna 11 for receiving a transmission electric wave from a GPS satellite, a GPS receiver 12 as a reception unit for acquiring and demodulating the transmission electric wave of the GPS satellite, a time counter 13 for counting the present time, a temperature indicator 14 as a variation detecting unit for electrically measuring temperature, a display unit 15 for displaying various images such as position information, etc., a power source 16 for supplying an operation voltage to each part, an intermittent reception time controller 17 for timely controlling the intermittent position measurement, CPU (central processing unit) 10 for performing comprehensive control of the respective parts, RAM (Random Access Memory) 18 for supplying a working memory space to CPU 10, ROM (Read Only Memory) 19 for storing a control program executed by CPU 10 and control data, a non-volatile memory 20 as a storage unit for storing position data and various kinds of data for positioning, etc.

The GPS receiver 12 matches the reception frequency with the frequency corresponding to the movement position of the GPS satellite, and also performs de-spreading processing of a reception signal by using a predetermined spread code while establishing synchronization of processing timing with the GPS satellite, thereby acquiring and demodulating the transmission electric wave of the GPS satellite which is subjected to spectrum spreading. Furthermore, the processing of the reception signal as described above is executed for a plurality of GPS satellites. Here, the GPS receiver 12 performs the setting of the reception frequency corresponding to each GPS satellite and the synchronization of the processing timing with each GPS satellite according to the information of the present time supplied from CPU 10. However, when the transmission electric wave cannot be acquired because the information of the present time contains an error, the reception processing is repeated while shifting the reception frequency or the processing timing little by little, whereby the reception frequency the processing timing which correspond to each GPS satellite are found out and the transmission signal of each GPS satellite is acquired and demodulated. Accordingly, when the information of the present time supplied from CPU 10 is accurate, the transmission electric wave of the GPS satellite can be acquired within a very short time. However, when the information of the present time contains a large error, it takes a long time to acquire the transmission electric wave.

The time counter 13 counts the time on the basis of a signal from a crystal oscillator, for example, and it has a larger error as compared with the atomic clock provided to the GPS satellite. The error per unit time of the counted time is generally constant when there is no temperature variation, and it varies in accordance with increase/decrease of the temperature.

The temperature indicator 14 comprises a temperature detecting element such as a thermistor or the like for converting temperature to an electrical signal, an AD converter for sampling an electrical signal (voltage) representing the temperature and converting the sampled electrical signal to digital data, etc.

The intermittent reception time controller 17 is a circuit for counting the time for an intermittent reception period designated by CPU 10 (for example, a period of 30 minutes), generating a timing signal at the timing of the intermittent reception and notifying this timing to CPU 10.

In ROM 19 is stored a positioning control processing program for intermittently executing the position measurement based on GPS and continually obtaining accurate time on the basis of time information from the GPS satellite. This positioning control processing program is stored in ROM 19, and further may be stored in a portable storage medium such as an optical disc or the like or a non-volatile memory such as a flash memory or the like, which are readable by CPU 10 through a data reading device. Furthermore, there may be adopted such a style that a program as described above may be downloaded into the positioning device 1 through a communication line with carrier waves as a medium.

In the non-volatile memory 20 is stored not only position data of a measurement result, but also almanac information and ephemeris information received as positioning data from a GPS satellite. The ephemeris information is navigation information for specifying the position of each GPS satellite, and it can be used for several hours to specify the position of the corresponding GPS satellite by temporarily receiving and storing it.

Figure 2:
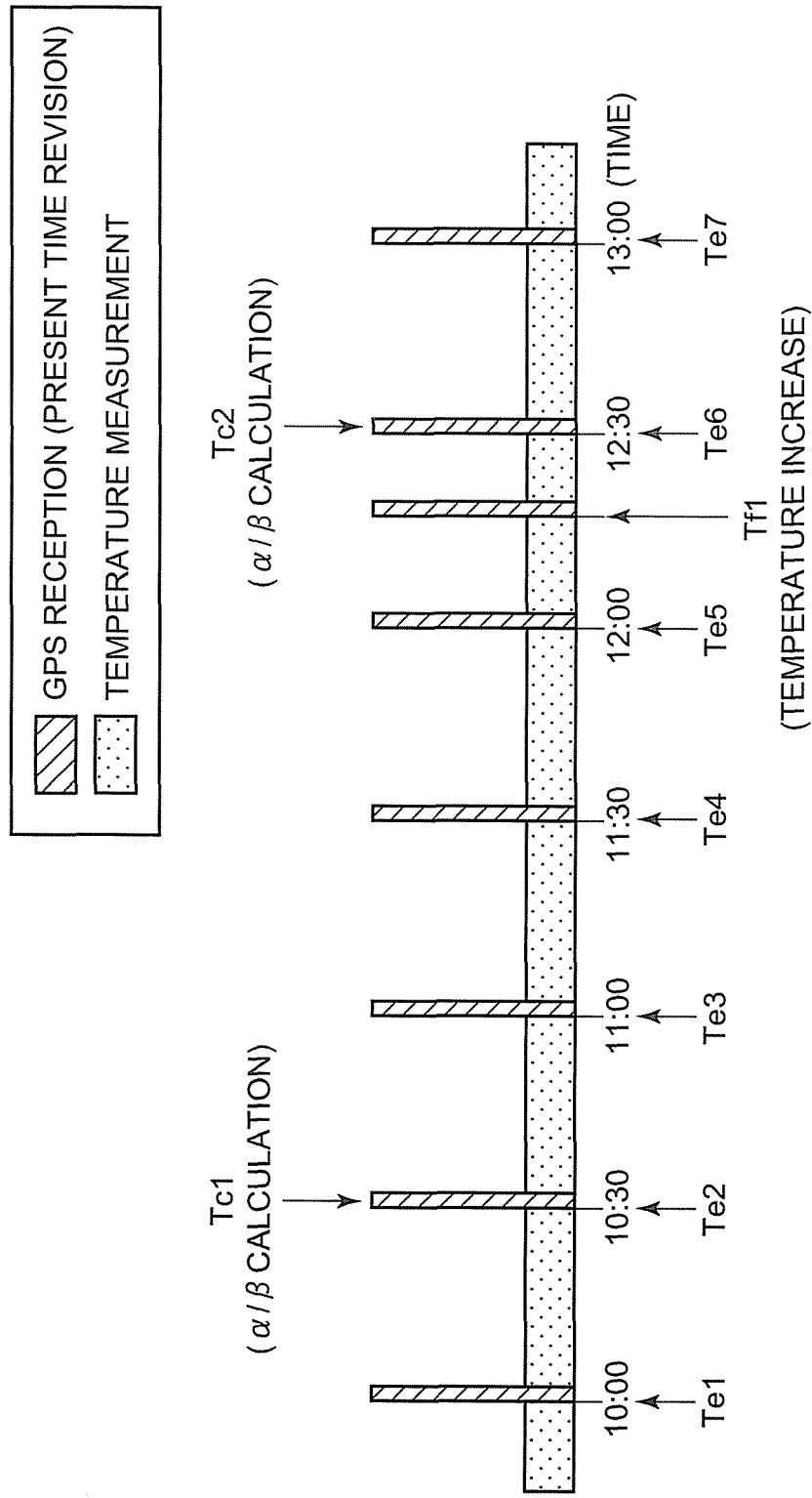
FIG. 2 is a diagram showing an example of the operation of the positioning device.

FIG. 2 is a diagram showing an example of the operation of the positioning control processing of the positioning device 1.

With respect to the positioning device 1 of this embodiment, as shown in FIG. 2, reception of a signal from a GPS satellite is executed at intermittent timings of Te1 to Te7 like a period of 30 minutes or the like, and the processing of measuring the position, the time revision processing of the time counter 13 based on GPS time, and the processing of receiving and storing ephemeris information are executed.

Out of these processing, the position measurement processing is executed by CPU 10 and the GPS receiver 12 as follows. That is, the GPS receiver 12 is first actuated on the basis of an instruction of CPU 10, and transmission electric waves of a plurality of GPS satellites are acquired by the GPS receiver 12. At this time, CPU 10 supplies the GPS receiver 12 with corrected time which is obtained by correcting the counted time of the time counter 13, and the GPS receiver 12 acquires the transmission electric waves on the basis of the accurate corrected time concerned within a very short time. When the transmission electric waves of the a plurality of GPS satellites are acquired, CPU 10 determines pseudo-distances to the respective GPS satellites on the basis of positioning codes of the transmission electric waves, and further calculates the position of each GPS satellite on the basis of the ephemeris information stored in the non-volatile memory 20. Furthermore, CPU 10 calculates the position thereof on the basis of these results. The calculated position data are stored in the non-volatile memory 20 together with the time information, for example.

The time revision processing of the time counter 13 on the basis of the GPS time is executed as follows. When the GPS receiver 12 acquires and receives the transmission electric wave of the GPS satellite, a built-in clock of the GPS receiver 12 substantially accurately synchronizes with the high-precision time (called as GPS time) of the GPS satellite on the basis of the time information contained in the transmission electric wave. Accordingly, when the transmission electric wave of the GPS satellite is received by the GPS receiver 12, CPU 10 reads out the time of the built-in clock to obtain accurate time. Then, the counted time of the time counter 13 is set to the thus-obtained accurate time to revise the time of the time counter 13.

The processing of receiving and storing the ephemeris information is executed by making the GPS receiver 12 track the transmission electric wave acquired for position measurement without modification to receive necessary ephemeris, and storing the received ephemeris information into the non-volatile memory 20. Furthermore, when there is a transmission electric wave of another GPS satellite which can be acquired even after the position measurement is completed, the ephemeris information of this GPS satellite is also received, and stored into the non-volatile memory 20. These reception processing is executed within a predetermined restricted time (for example, 40 seconds). As described above, the ephemeris information is received and stored, whereby the stored ephemeris information is used in the next position measurement processing to enable position measurement at short times.

Furthermore, with respect to the positioning device 1 of this embodiment, CPU 10 measures the error per unit time "$\alpha/\beta$" of the time counter 13 is measured at an appropriate time in order that the high-precision corrected time is supplied to the GPS receiver 12.

A method of measuring the error per unit time "$\alpha/\beta$" is as follows. That is, GPS time is received twice at some time interval, the time interval "$\beta$" from the reception time of the first GPS time till the reception time of the second GPS time and the increasing amount "$\alpha$" of the error of the time counter 13 from the reception time of the first GPS time till the reception time of the second GPS time are determined, and the ratio of the time interval and the increasing amount can be calculated.

In the example of FIG. 2, the two GPS times are obtained in connection with the twice GPS satellite signal reception processing at the timings Te1, Te2, and the error per unit time "$\alpha/\beta$" is calculated at the timing Tc1 at which the second GPS time is obtained.

The corrected time is obtained by calculating an estimated error of the time counter 13 at the present time point on the basis of the error per unit time "$\alpha/\beta$" and adding the estimated error to the counted time of the time counter 13. The estimated error is obtained by multiplying the time interval from the previous GPS satellite signal reception time till the counted time at the present time point by the error per unit time "$\alpha/\beta$". The counted time of the time counter 13 is revised to the GPS time at the GPS satellite signal reception time and thus the error is substantially equal to zero. Thereafter, the counted time of the time counter 13 is added with an error in a ratio of "$\alpha/\beta$" in connection with time lapse. Therefore, an accurate corrected time can be determined according to the above method.

Furthermore, in the positioning device 1 of this embodiment, in order to detect whether relatively large variation occurs in the variation amount of the error of the time counter 13, temperature measurement is executed by the temperature indicator 14 to continually check whether temperature variation having a predetermined amount or more occurs. Specifically, the temperature at the measurement timing of the error per unit time "$\alpha/\beta$" is stored, and this stored temperature is compared with the present measured temperature to check whether there is any variation of a predetermined amount or more.

Here, the average value of temperatures obtained through the twice GPS time reception periods to measure the error "$\alpha/\beta$" is set to the temperature to be stored, or the temperature at the first GPS time reception time point, the temperature at the second GPS time reception time point or the average value of these temperatures. In this embodiment, the temperature at the first GPS time reception time point in the twice GPS time reception period to measure the error "$\alpha/\beta$" is stored.

When the variation between the stored temperature and the present measured temperature is less than the predetermined amount, it is assumed that the error per unit time of the time counter 13 does not greatly vary from the finally calculated value "$\alpha/\beta$", and thus a new value is not calculated again. When a corrected time is required, the corrected time is calculated by using the error per unit time "$\alpha/\beta$" which has been finally calculated.

In the example of FIG. 2, the present temperature has no variation of the predetermined amount or more from the initially stored temperature till a timing Tf1 after the error per unit time "$\alpha/\beta$" of the time counter 13 is calculated at the timing Tc1. Therefore, after the error "$\alpha/\beta$" is calculated at the timing Tc1, the re-calculation of the above error "$\alpha/\beta$" is not executed even at the intermittent signal reception timings Te3 to Te5, and the corrected time is calculated by using the initially calculated value "$\alpha/\beta$".

On the other hand, when the variation between the stored temperature and the present measured temperature is more than the predetermined value, the error per unit time of the time counter 13 is regarded as greatly varying from the finally calculated value "$\alpha/\beta$", and this value "$\alpha/\beta P$" is cleared. Then, the processing of calculating the error per unit time "$\alpha/\beta$" is executed again to determine the value for dealing with the temperature variation.

In the example of FIG. 2, variation of the predetermined amount or more from the initially stored temperature occurs at the timing Tf1. Therefore, the initially calculated error per unit time "$\alpha/\beta$" is cleared at this time point, and in order to obtain the error per unit time "$\alpha/\beta$" again, the reception of the GPS satellite signal is started to get the first GPS time. Then, when the second GPS time is gotten at the timing Te6 of the subsequent intermittent signal reception, the error per unit time "$\alpha/\beta$" of the time counter 13 is newly calculated at the timing Tc2.

Through the re-calculation processing as described above, the newly calculated value "$\alpha/\beta$" becomes the error per unit time concerning the temperature of the timing Tf1. Thereafter, when no great variation occurs in the temperature, it is possible to determine the accurate corrected time on the basis of this value "$\alpha/\beta$" again.

According to the series of positioning control processing, high-precision corrected time can be calculated from the counted time of the time counter 13 in many periods. The acquiring processing of the transmission electric wave is executed by using this corrected time at the GPS satellite signal reception which is intermittently executed, whereby the quick position measurement and the quick reception of ephemeris information can be performed.

According to the series of positioning control processing described above, the counted time of the time counter 13 is corrected on the basis of the error per unit time "$\alpha/\beta$" of the time counter 13 to determine the accurate time. Therefore, the position measurement and the intermittent reception of ephemeris information are performed at a time interval of 30 minutes, and as compared with the construction that the signal reception for correcting the time is executed at a short period such as a time interval of 10 minutes so that the error of the time counter 13 is not magnified, the frequency of the signal reception is reduced to reduce the power consumption.

An example of the control procedure implementing the above positioning control processing will be described with reference to a flowchart.

Figure 3:
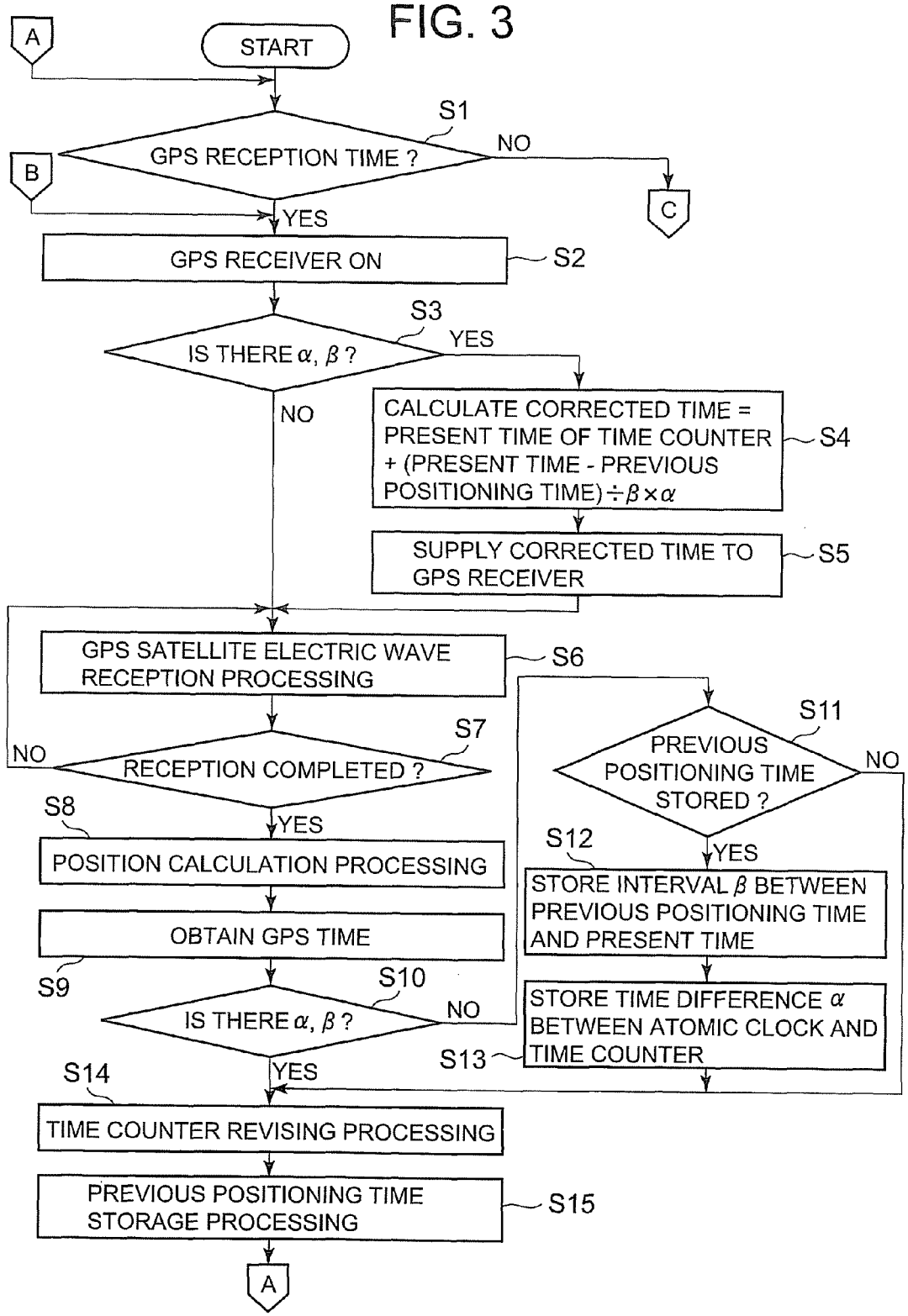
FIG. 3 is a first part of a flowchart showing the procedure of positioning control processing executed by CPU.
Figure 4:
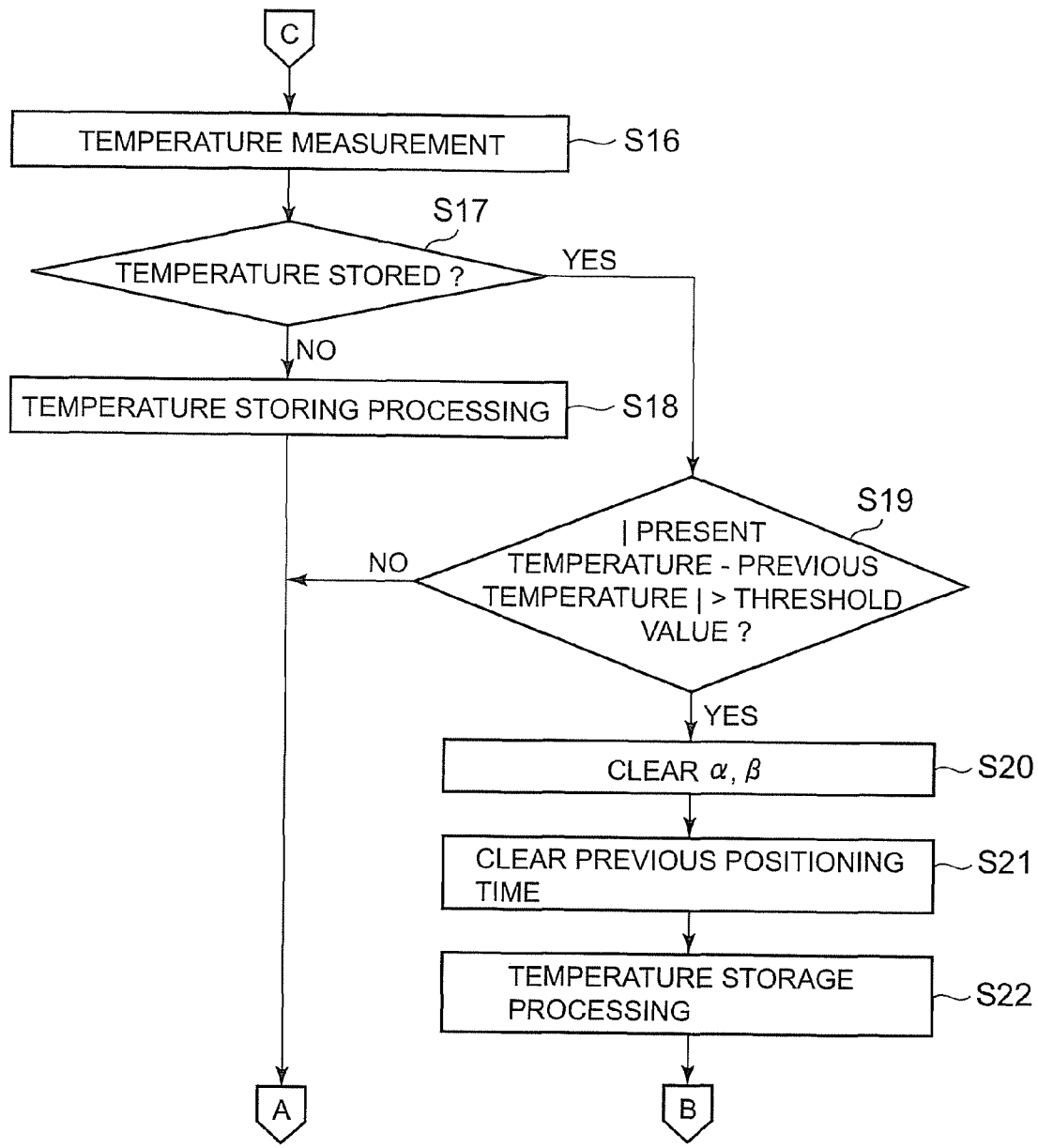
FIG. 4 is a second part of the flowchart showing the procedure of the positioning control processing.

FIGS. 3 and 4 are flowcharts representing the procedure of the positioning control processing.

This positioning control processing is started upon power-on and continually executed. When the positioning control processing is started, CPU 10 first judges on the basis of a notification from the intermittent reception time controller 17 whether a reception time of a GPS satellite signal comes (00 minute or 30 minutes every hour) (step S1). As a result, when the time concerned has not yet come, the processing is shifted through the step S16 to the processing concerning the temperature measurement (FIG. 4), and when the time concerned has come, the processing is shifted through the step S2 to the processing concerning the GPS satellite signal reception (step S2 and subsequent steps).

When it is determined that the time concerned has come and thus the processing is shifted to the step S2, CPU 10 first actuates the GPS receiver 12 (step S2), and then determines whether each parameter representing the error per unit time "α/β" of the time counter 13 is stored in RAM 18.

As a result, when it is determined that each parameter is stored, the corrected time is calculated by using these parameters (step S4: time correcting unit). That is, the present counted time of the time counter 13 is added with "(present time−previous positioning time)×α/β" as an estimated error, and the addition result is set to the corrected time. This corrected time is supplied to the GPS receiver 12 (step S5). Accordingly, the corrected time is set in the built-in clock of the GPS receiver 12, and the accurate time is counted.

On the other hand, when each parameter of "α/β" has not yet been stored, the corrected time cannot be calculated, and thus the processing of the steps S4 and S5 is omitted.

Subsequently, CPU 10 makes the GPS receiver 12 execute the reception processing to input a demodulation signal from the GPS receiver 12 (step S6). Here, when the corrected time is supplied, the GPS receiver 12 can acquire the transmission electric wave of the GPS satellite and execute the signal reception within an extremely short time. Furthermore, CPU 10 judges whether the necessary signal reception has been completed (step S7). When the signal reception has not yet been completed, CPU 10 continues the reception processing of the step S6 until the signal reception is completed. In this reception processing, reception of positioning codes from four GPS satellites being necessary for position measurement and reception of ephemeris information from a plurality of GPS satellites located at signal receivable positions are performed. The received ephemeris information is stored into the non-volatile memory 20.

When the reception is completed, CPU 10 executes positioning calculation for determining the present position on the basis of the received positioning code (step S8). The steps S6 to S8 constitute a positioning unit. Subsequently, CPU 10 takes the GPS time which is substantially perfectly synchronous with the atomic clock in the GPS satellite from the GPS receiver (step S9). Thereafter, CPU 10 determines whether the respective parameters of the error per unit time "α/β" of the time counter 13 are stored in RAM 18 (step S10).

As a result, when the respective parameters are stored, it is unnecessary to calculate these parameters, and thus the processing directly shifts to the step S14. On the other hand, when the respective parameters are not stored, the processing shifts to the step S11 to calculate these parameters. When the processing shifts to the step S11, CPU 10 checks whether the previous positioning time is stored in RAM 18 (step S11). When no previous positioning time is stored, the parameters have not yet been enabled to be calculated, and thus the processing directly shifts to step S14. Here, the previous positioning time means time information stored in step S15 described later, and it represents a time at which the time revision of the time counter 13 was executed in connection with the previous GPS satellite signal reception.

On the other hand, when it is judged in the checking processing of the step S11 that the previous positioning time is stored, the difference between the previous positioning time and the present time is calculated, and this time interval is stored in the parameter "β" (step S12). Subsequently, the time difference between the GPS time obtained in the step S9 (the time of the atomic clock in the GPS satellite) and the counted time of the time counter 13 is calculated, and this value is stored in the parameter "α" (step S13). The error per unit time of the time counter 13 is represented by these parameters "α" and "β", and the steps S12 and S13 described above constitute an error calculator. Then, the processing shifts to step S14.

When the processing shifts to the step S14, CPU 10 first executes the revision processing of removing the error of the counted time of the time counter 13 on the basis of the GPS time obtained in step S9 (step S14: time revising unit). The time at this time point is stored as the previous positioning time into a predetermined area of RAM 18 (step S15). Then, CPU 10 finishes the first reception processing, and the processing returns to the step S1 again.

Next, a case where it is judged in the judgment processing of the step S1 that the time of the signal reception has not yet come will be described. When the processing shifts to step S16 because the signal reception time has not yet come, CPU 10 first inputs sampling data from the temperature indicator 14 (step S16), and then checks whether temperature data is stored in a predetermined area of RAM 18 (step S17). When no temperature data is stored, CPU 10 stores the temperature data input in step S16 into a predetermined area of RAM 18 (step S18). Then, the processing returns to the step S1 again.

On the other hand, it is determined in step S17 that temperature data is stored, the difference between the stored temperature ("previous temperature") and the present temperature obtained in step S16 is calculated, and it is determined whether this difference exceeds a predetermined threshold value (step S19). That is, it is determined through this comparison whether relatively large variation occurs in the error per unit time "α/β" of the time counter 13.

When it is determined in the determination processing that the temperature difference exceeds the threshold value, the respective parameters of the error per unit time "α/β" stored in RAM 18 are cleared (step S20), and the previous positioning time stored in RAM 18 is cleared to re-try the calculation of the respective parameters (step S21). Furthermore, the first signal reception out of the twice GPS signal receptions being necessary for re-calculation of the error "α/β" will be executed just after, and thus the temperature data obtained in step S16 as the temperature at this time point is stored in a predetermined area of RAM 18 (step S22). Then, the processing jumps to the step S2 to perform signal reception irrespective of whether the time of the GPS satellite signal reception has come or not.

Furthermore, when it is determined in the determination processing of the step S19 that the temperature difference does not exceed the threshold value, the processing directly returns to the step S1.

That is, according to the control procedure of the positioning control processing shown in FIGS. 3 and 4, when the time of the GPS satellite signal reception has come, the signal from the GPS satellite is received through the processing of steps S2 to S15, and the position measurement, the reception and storage of the ephemeris information and the time revision of the time counter 13 are performed. Furthermore, during the measurement of the error per unit time "α/β" of the time counter 13, the processing for calculating the error is also executed.

In other than the time of the GPS satellite signal reception, the temperature measurement and the comparison of the temperature variation are repetitively executed through the loop processing of the steps S1, s16, S17 and S19, and further when the temperature variation exceeds the threshold value, the processing is shifted to the first GPS signal reception for calculating the error per unit time "α/β" of the time counter 13.

As described above, according to the positioning device 1 of this embodiment, the error per unit time "α/β" of the time counter 13 is calculated on the basis of the GPS time received from the GPS satellite, the counted time of the time counter 13 is corrected to an accurate time on the basis of the calculated error per unit time "α/β", and the thus-corrected accurate time is used for the acquiring processing of the transmission electric wave of the GPS satellite, so that the transmission electric wave can be quickly acquired on the basis of the accurate time information. Furthermore, in order to enable to obtain accurate time, it is unnecessary to perform the GPS satellite signal reception (reception of GPS time) at a short period, and thus the frequency of the signal reception can be reduced and thus the power consumption can be reduced.

Furthermore, the ephemeris information being necessary for the position measurement is pre-stored in the non-volatile memory 20 by intermittent reception, and thus the position measurement can be quickly implemented by using the ephemeris information of the non-volatile memory 20 in the positioning calculation.

According to the positioning device 1 of this embodiment, the temperature is measured by the temperature indicator 14, and when a relatively large variation is regarded as occurring in the time-dependent variation amount of the error of the time counter 13, the error per time unit "α/β" which has been obtained at that time point is cleared, and the value of the error per unit time is calculated again. Accordingly, this embodiment can deal with an external factor such as temperature variation or the like which fluctuates the variation amount of the error of the time counter 13, and thus the counted time can be accurately corrected in many periods.

When the temperature measurement is executed by the temperature indicator 14 and it is regarded that relatively large variation occurs in the timely variation amount of the error of the time counter 13, in order to re-calculate the error per unit time "α/β", the time interval of the intermittent reception is narrowed, and just after that, the GPS satellite signal reception is started. Therefore, the value "α/β" being suitable after the variation of the error can be quickly calculated, so that a counted-time correctable state can be set.

The present invention is not limited to the above embodiment, and various modifications may be made. For example, in the above embodiment, the time interval at which the GPS time is intermittently received and the counted time of the time counter 13 is revised is set to a time interval of 30 minutes which is equal to the time interval of the position measurement or the time interval of the reception of ephemeris information. However, this time interval may be appropriately set and changed to 20 minutes, one hour, two hours or the like. Furthermore, separately from the position measurement and the reception of ephemeris information, the reception of GPS time may be executed through the GPS satellite signal reception.

In the above embodiment, the temperature variation is detected to determine whether the error per unit time "α/β" of the time counter 13 varies relatively greatly. However, when there is an external factor for varying the precision of the time counter 13, the external factor may be detected to determine the presence or absence of the variation concerned. Furthermore, the error per unit time "α/β" of the time counter 13 may be calculated every time the GPS time is received, thereby directly detect the variation of the precision of the time counter 13.

For example, when no variation is detected in the precision of the time counter 13, the time interval at which the GPS time is received may be gradually lengthened, and when variation of the precision of the time counter 13 is detected, the time interval at which the GPS time is received may be shortened so that the re-calculation of the error per unit time "α/β" of the time counter 13 can be executed early.

Furthermore, in the above embodiment, when there is no temperature variation exceeding the threshold value, the error per unit time "α/β" of the time counter 13 is not re-calculated. However, the error "α/β" may be re-calculated and updated every timing at which the GPS satellite signal is received to obtain the GPS time. In the above embodiment, the built-in clock of the GPS receiver 12 and the time counter 13 are designed as separate constructions. However, when the built-in clock of the GPS receiver 12 is constructed to operate at all times, the built-in clock of the GPS receiver 12 may be diverted as the time counter 13.

The detailed construction and the detailed method of the above embodiment may be appropriately changed without departing from the subject matter of the present invention.

What is claimed is:

1. A positioning device comprising:
   a reception unit for receiving a signal transmitted from a positioning satellite;
   a time counter for counting time;
   a first reception controller for intermittently receiving time information from the positioning satellite through the reception unit;
   a time revising unit for revising the time counted by the time counter based on the received time information;
   an error calculator for calculating an error per unit time in the time counted by the time counter based on the received time information and the time counted by the time counter;
   a time correcting unit for calculating corrected time by removing an error from the time counted by the time counter based on the calculated error per unit time;
   a positioning unit for acquiring a signal of the positioning satellite by using the corrected time and measuring a position of the positioning device based on the acquired signal; and
   a variation detecting unit for detecting an external factor causing variation in precision of the time counter or directly detecting variation in the precision,
   wherein the error calculator re-calculates the error per unit time when the precision of the time counter is determined as being varied based on a detection result of the variation detecting unit.

2. A positioning device comprising:
   a reception unit for receiving a signal transmitted from a positioning satellite;
   a time counter for counting time;

a first reception controller for intermittently receiving time information from the positioning satellite through the reception unit;

a time revising unit for revising the time counted by the time counter based on the received time information;

an error calculator for calculating an error per unit time in the time counted by the time counter based on the received time information and the time counted by the time counter;

a time correcting unit for calculating corrected time by removing an error from the time counted by the time counter based on the calculated error per unit time;

a positioning unit for acquiring a signal of the positioning satellite by using the corrected time and measuring a position of the positioning device based on the acquired signal; and a variation detecting unit for detecting an external factor causing variation in precision of the time counter or directly detecting variation in the precision, wherein the first reception controller changes a time interval at which the time information is intermittently received so as to be short when the precision of the time counter is determined as being varied based on a detection result of the variation detecting unit.

3. The positioning device according to claim 1, further comprising:

a second reception controller for intermittently receiving navigation information, which is necessary for measuring the position of the positioning device, from the positioning satellite through the reception unit; and a storage unit for storing the received navigation information, wherein the positioning unit determines a position of the positioning satellite based on the navigation information stored in the storage unit to measure the position of the positioning device.

4. A positioning method for performing positioning of a positioning device by using a reception unit which receives a signal transmitted from a positioning satellite and a time counter which counts time, comprising:

first controlling intermittent reception of time information from the positioning satellite through the reception unit;

revising the time counted by the time counter based on the received time information;

calculating an error per unit time in the time counted by the time counter based on the received time information and the time counted by the time counter;

correcting the time to obtain corrected time by removing an error from the time counted by the time counter based on the calculated error per unit time; and positioning the position of the positioning device by acquiring a signal of the positioning satellite by using the corrected time and by measuring the position of the positioning device based on the acquired signal; and detecting an external factor causing variation in precision of the time counter or directly detecting variation in the precision, wherein the calculating step to calculate the error per unit time re-calculates the error per unit time when the precision of the time counter is determined as being varied based on a detection result of the detecting step.

5. A positioning method for performing positioning of a positioning device by using a reception unit which receives a signal transmitted from a positioning satellite and a time counter which counts time, comprising:

first controlling intermittent reception of time information from the positioning satellite through the reception unit;

revising the time counted by the time counter based on the received time information;

calculating an error per unit time in the time counted by the time counter based on the received time information and the time counted by the time counter;

correcting the time to obtain corrected time by removing an error from the time counted by the time counter based on the calculated error per unit time; and positioning the position of the positioning device by acquiring a signal of the positioning satellite by using the corrected time and by measuring the position of the positioning device based on the acquired signal; and detecting an external factor causing variation in precision of the time counter or directly detecting variation in the precision, wherein the first controlling step changes a time interval at which the time information is intermittently received so as to be short when the precision of the time counter is determined as being varied based on a detection result of the detecting step.

6. A non-transitory storage medium readable by a computer that controls a reception unit for receiving a signal transmitted from a positioning satellite and a time counter for counting time, the storage medium storing a program making the computer realize functions of:

a first reception control function of intermittently receiving time information from the positioning satellite through the reception unit;

a time revising function of revising the time counted by the time counter based on the received time information;

an error calculating function of calculating an error per unit time in the time counted by the time counter based on the received time information and the time counted by of the time counter;

a time correcting function of calculating a corrected time by removing an error from the time counted by the time counter based on the calculated error per unit time;

a positioning function of acquiring a signal of the positioning satellite by using the corrected time to measure a position of a positioning device based on the acquired signal; and a variation detecting function of detecting an external factor causing variation in precision of the time counter or directly detecting variation in the precision, wherein the error calculating function re-calculates the error per unit time when the precision of the time counter is determined as being varied based on a detection result of the variation detecting function.

7. A non-transitory storage medium readable by a computer that controls a reception unit for receiving a signal transmitted from a positioning satellite and a time counter for counting time, the storage medium storing a program making the computer realize functions of:

a first reception control function of intermittently receiving time information from the positioning satellite through the reception unit;

a time revising function of revising the time counted by the time counter based on the received time information;

an error calculating function of calculating an error per unit time in the time counted by the time counter based on the received time information and the time counted by of the time counter;

a time correcting function of calculating a corrected time by removing an error from the time counted by the time counter based on the calculated error per unit time;

a positioning function of acquiring a signal of the positioning satellite by using the corrected time to measure a position of a positioning device based on the acquired signal; and a variation detecting function of detecting an external factor causing variation in precision of the time counter or directly detecting variation in the precision, wherein the first reception control function changes a time interval at which the time information is intermittently received so as to be short when the precision of the time counter is determined as being varied based on a detection result of the variation detecting function.

\* \* \* \* \*